March 10, 1931.   F. CLARK   1,795,835
REVERSIBLE SIFTER
Filed Feb. 5, 1930

Inventor
Frank Clark.
By Lacey & Lacey, Attorney

Patented Mar. 10, 1931

1,795,835

UNITED STATES PATENT OFFICE

FRANK CLARK, OF DOLLIVER, IOWA

REVERSIBLE SIFTER

Application filed February 5, 1930. Serial No. 426,105.

This invention relates to kitchen utensils and more particularly to sifters for sifting flour and like materials and also for mixing with the flour other pulverized materials such as soda, baking powder, salt and the like in preparing the flour for special baking purposes.

An object of the invention is to produce a sifter having a novel grip on the side forming means to support the sifter and enable it to be turned or reversed endwise.

A further object of the invention is to provide a sifter having an endwise reversible container and a reversible sieve therein, the sieve being provided with a sleeve which is housed within the tubular grip of the container and terminates in a disc by means of which the sieve may be readily reversed so that by reversing the position of the container, the material may be alternately sifted through the sieve in opposite directions and fall therefrom alternately into the opposite ends of the container.

Another object of the invention is to provide novel locking means between the operating disc of the reversible sieve and the tubular grip of the container, whereby the sieve may be locked stationary in either of the reversed positions thereof.

With the above and other objects in view the invention consists in certain novel details of construction and combinations of parts hereinafter fully described and claimed it being understood that various modifications may be resorted to within the scope of the appended claim without departing from the spirit or sacrificing any of the advantages of the invention.

In the accompanying drawing forming part of this specification,

Figure 1:
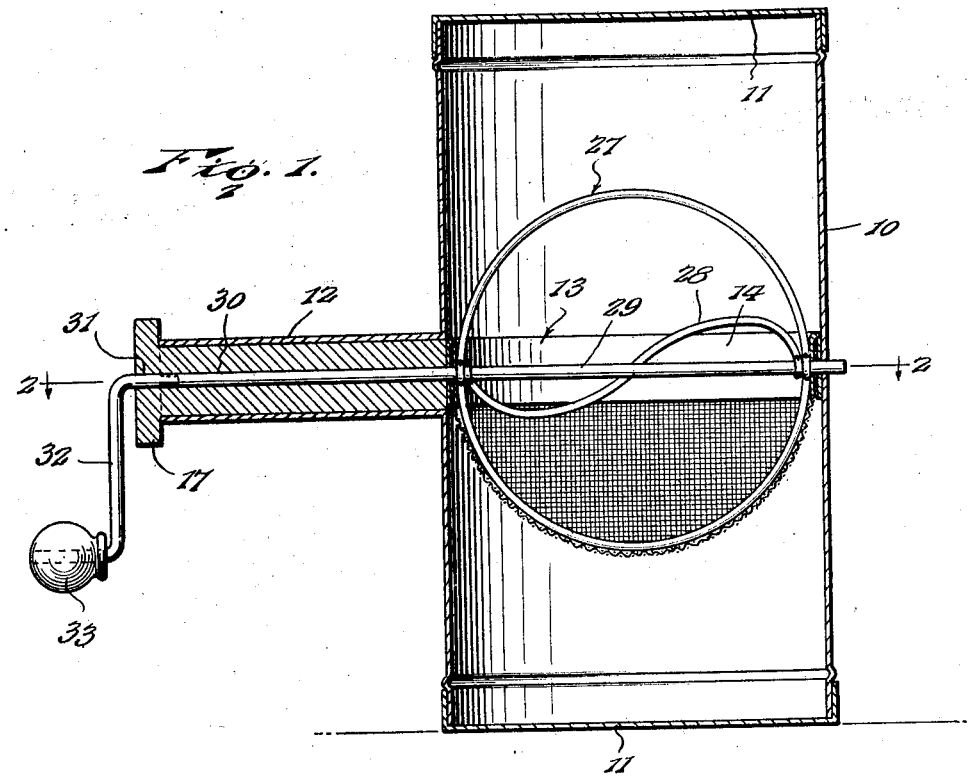
Figure 1 is a vertical sectional view through my improved sifter.

Referring now to the drawing in which like characters of reference designate similar parts, 10 designates a container which is cylindrical in outline and is open at both ends. Covers 11 close the opposite ends of the container. A tubular grip 12 is formed integrally with and extends laterally from the wall of the container and is located substantially midway between the covers 11. The grip forms means whereby the container may be reversed endwise so that the material may be alternately sifted through the hereinafter described sieve in opposite directions.

Disposed within the container is a sieve 13. The sieve is as usual formed of wire netting of a desired mesh and is reinforced at its edges by a rim 14.

Rotatably mounted in the tubular grip 12 is a sleeve 15 preferably formed of wood or like material. The sleeve extends through the inner open end of the tubular grip and projects into the container 10. Screws 16 are passed through the rim 14 of the sieve and into the inner end of the sleeve 15 and rigidly secure the sieve to the sleeve.

The sleeve 15 terminates at the outer end in a disc 17. The disc is sufficient in diameter to extend circumferentially beyond the tubular grip 12 so as to be easily grasped by the fingers for the purpose of rotating the sleeve and thereby reversing the sieve as will be presently described.

Formed in the outer edge of the tubular grip 12 is a pair of longitudinal slots or notches 18 and 19, these notches being arranged diametrically opposite each other. A radial slot or notch 20 is formed in the disc 17. A catch 21 of substantially J shape, is slidably fitted in the notch 20 and is provided with a shank 22 which is receivable in a longitudinal slot 23 formed in the sleeve 15. A pin 24 is passed through the inner end of the shank and into the sleeve to pivotally secure the catch to the sleeve. A spring 25 is mounted in an axial recess in the sleeve and bears against the shank of the catch to yieldably hold the latter outwardly against the tubular grip 12. A lug 26 is formed on the shank of the catch and is urged by the spring into one of the notches 18 or 19 at each half turn of the sleeve to reverse the sieve, and locks the sieve in either of the reversed positions thereof.

A rotary agitator designated in general by the numeral 27 is mounted in the container. The agitator comprises a plurality of curved arms 28 spaced about the axis of a supporting and operating shaft 29. In the present embodiment four of these agitator arms are used but a greater or less number may be employed. Either wire or sheet metal may be used in the construction. The present embodiment employs wire. The longitudinal curvature of the agitator arms is such as to cause them to conform closely to the contour of the inner surface of the sleeve.

One end of the above mentioned agitator shaft 29 is journaled in the wall of the container and the opposite end is rotatably mounted in registering openings 30 and 31 formed in the sleeve 12 and disc 17 respectively. The outer end of the agitator shaft terminates in a crank 32 which is equipped with a grip 33.

In operation, one of the covers 11 is removed and the material to be sifted, or sifted and mixed, is poured into the basket-like sieve 13. The cover is now replaced and the agitator device is rotated through the medium of the crank 32 until all of the material has been forced through the sieve into the bottom of the container 10.

Figure 2:
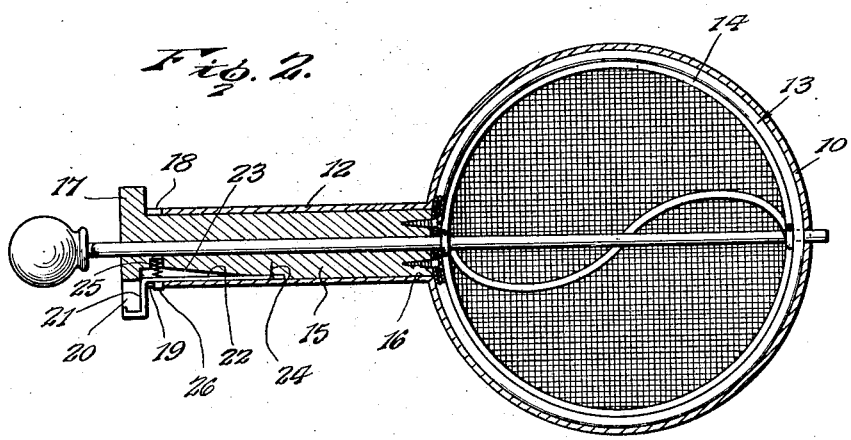
Figure 2 is a cross-sectional view on the line 2—2 of Figure 1.

Thereafter the basket-like sieve is reversed, first by depressing the catch 21 to withdraw the lug 26 from the slot 19, as shown in Figure 2, and then turning the disc 17 through one half revolution until the lug 26 is pressed by the spring 25 into the diametrically opposite notch 18 of the tubular grip 12. This movement of the disc 17 rotates the sleeve 15 and reverses the position of the sieve 13 so that the sieve is now turned upwardly in the container.

Thereupon the entire container is endwise reversed by simply grasping the tubular grip 12 in the right hand, palm upward, and turning the wrist to turn the container through one half revolution. The agitator may now again be rotated to again force the material through the sieve as above described. These operations will be repeated until the material has been sufficiently sifted or mixed.

Having thus described the invention, I claim:

A sifter comprising a container, a reversible sieve therein, a rotary beater therein, a tubular grip extending laterally from the container and adapted to reverse the container endwise, a sleeve within the grip fixedly secured to the sieve and adapted to reverse the sieve, said sleeve terminating in a disk for rotating the sleeve, said disk having a radial recess therein, said sleeve having a longitudinal recess therein communicating with the disk recess. A J-shaped catch disposed in the recess of the disk and having an integral shank disposed in the recess of the sleeve, said shank being terminally pivoted to said sleeve, said shank having a lug receivable in either of two notches formed at diametrically opposite points in said tubular grip to lock said sleeve stationary in either of its reversed positions, and a spring disposed radially in said sleeve and bearing against the underneath face of said shank and adapted to yieldably hold said lug in either of said recesses, said J-shaped catch being adapted to be depressed radially in the recess of said disk by the operator's fingers to disengage said lug from one of said recesses to permit rotation of said sleeve.

In testimony whereof I affix my signature.

FRANK CLARK. [L. S.]